United States Patent [19]

Lansinger

[11] 4,134,484

[45] Jan. 16, 1979

[54] FLUID COUPLING

[75] Inventor: Jere R. Lansinger, Bloomfield Hills, Mich.

[73] Assignee: Chrysler Corporation, Highland Park, Mich.

[21] Appl. No.: 791,762

[22] Filed: Apr. 28, 1977

[51] Int. Cl.² .................................................. F16D 31/00
[52] U.S. Cl. .................................. 192/58 B; 192/82 T
[58] Field of Search .............. 192/58 B, 82 T; 415/88, 415/89

[56] References Cited

U.S. PATENT DOCUMENTS

| 3,559,786 | 2/1971 | Long | 192/82 T |
| 3,791,757 | 2/1974 | Tarifa | 415/88 |
| 3,983,980 | 5/1976 | Weintz | 192/82 T |

*Primary Examiner*—Samuel Scott
*Assistant Examiner*—Gerald A. Anderson
*Attorney, Agent, or Firm*—Baldwin & Newtson

[57] ABSTRACT

A viscous fluid coupling for a fan drive in an automotive vehicle, including a stamped sheet metal input member inside a cast metal output member. The output member has a fluid reservoir formed of a sheet metal stamping attached to a ledge. A moveable reed valve permits fluid to flow from the reservoir to a working space between the input and output members.

20 Claims, 7 Drawing Figures

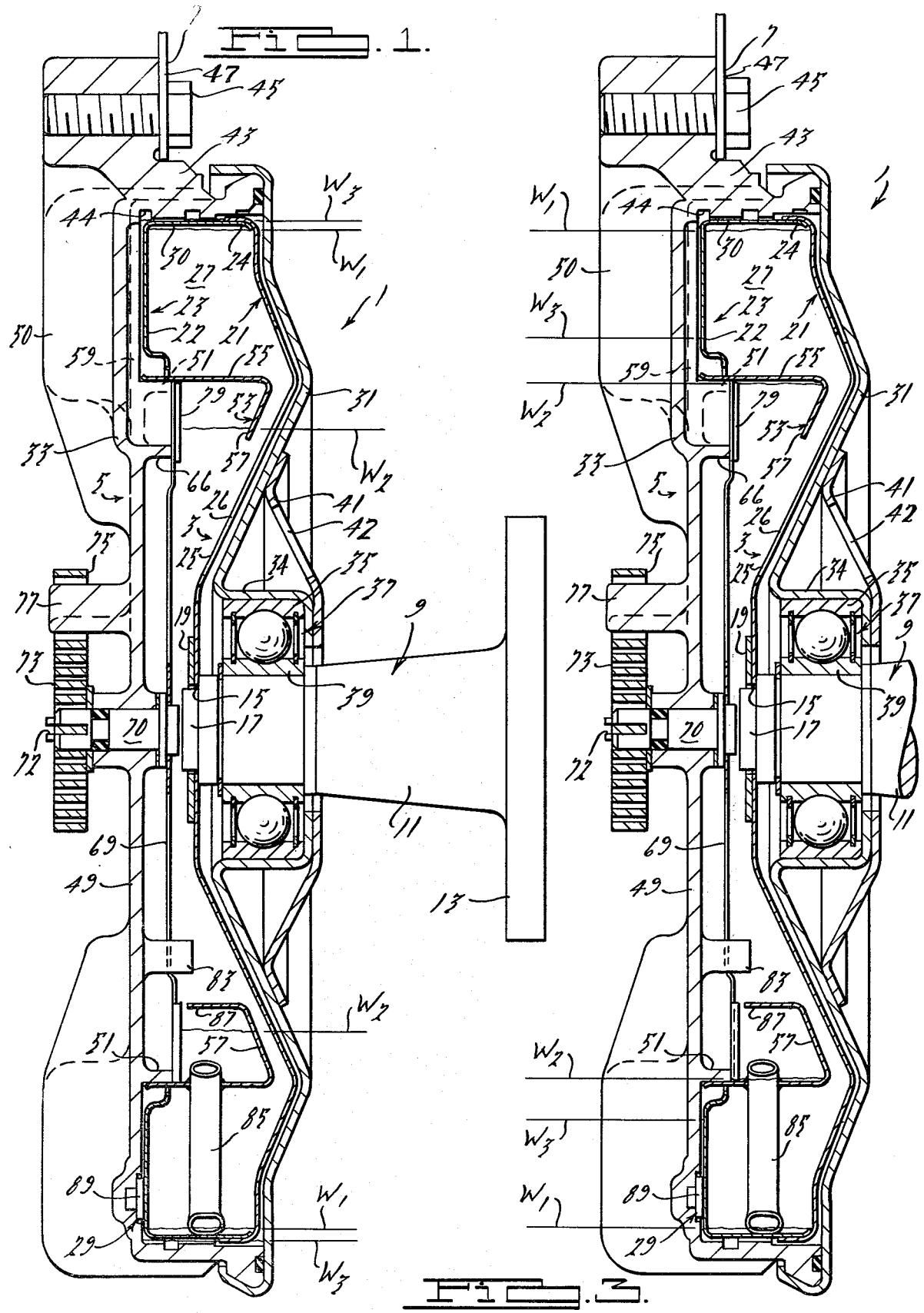

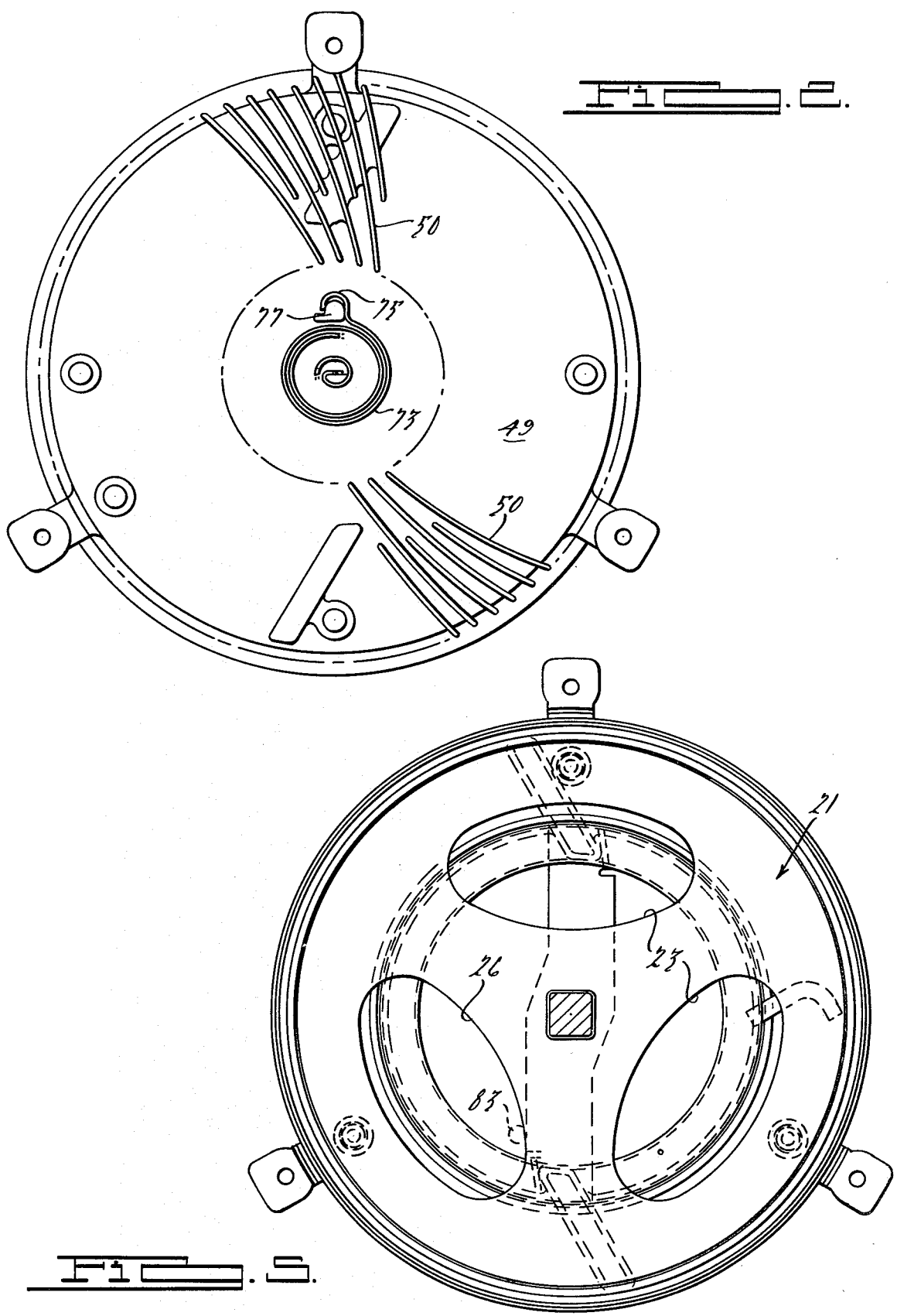

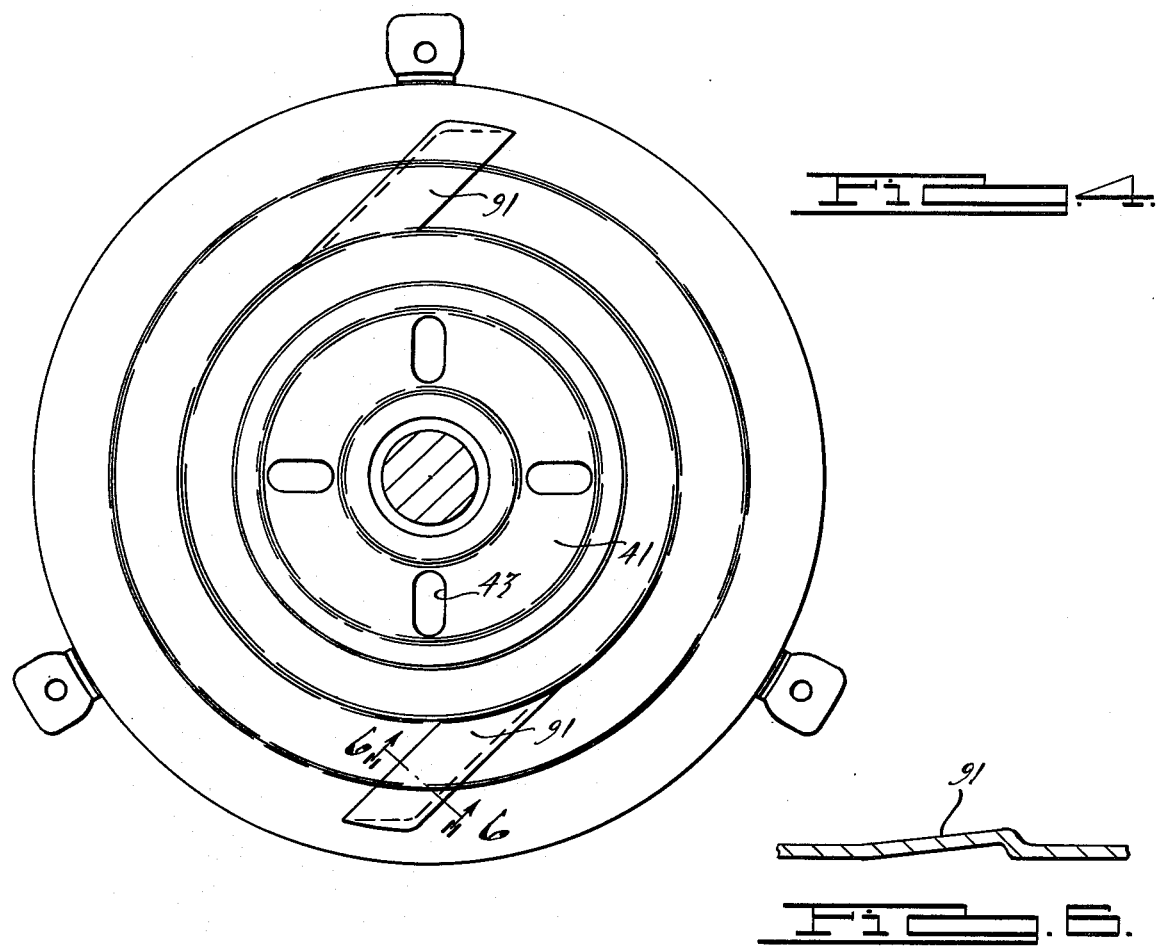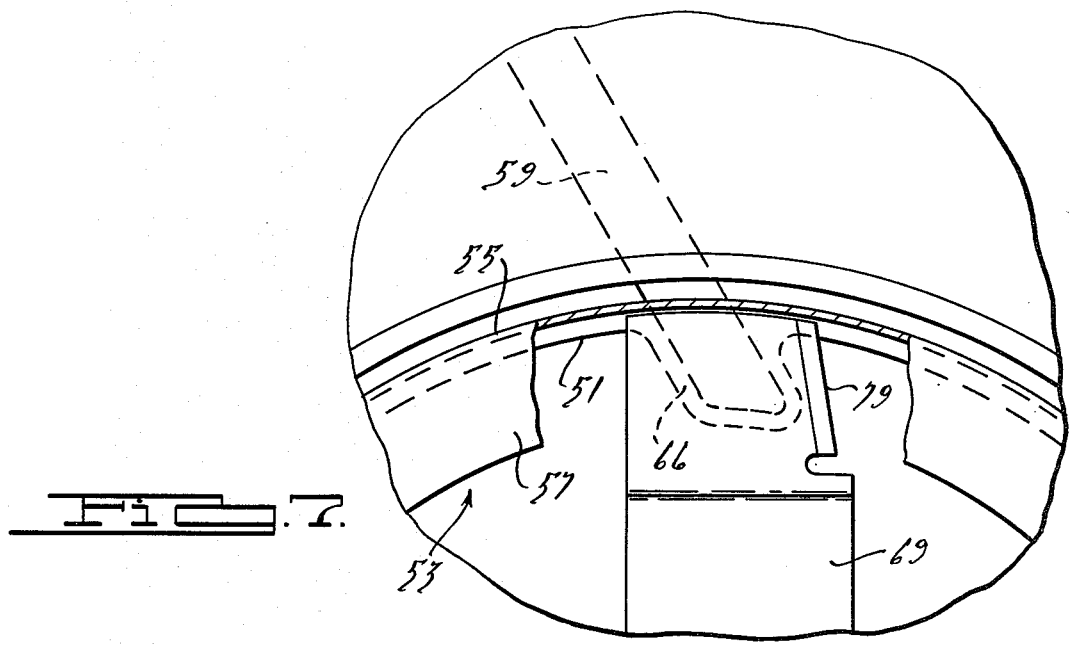

FLUID COUPLING

BACKGROUND OF THE INVENTION

This invention relates to a fluid coupling and more particularly to a viscous fluid coupling for connecting the engine of an automotive vehicle to a cooling fan for the engine radiator.

Viscous couplings have been used for many years to provide the driving connection between an engine and its radiator fan to control the air flow through the cooling radiator. These couplings conventionally use a fluid medium, such as silicone oil, to transmit torque between rotatable coupling members.

Engine cooling studies on passenger cars and trucks have shown that operation of the fan for engine cooling purposes is required only a fraction of the time, such as one-fifth, for example, the vehicle is on the road. Moreover, if the fan is run at a high speed, fuel may be wasted and the noise produced may be objectionable. Accordingly, the viscous couplings developed over the past several years sought to reduce the high speed operation of the fans as well as control the operation in an effort to reduce the total energy required for operating the fan. These viscous couplings relied on the drive force created by fluid shear which occurred between the two members having mating annular grooves and ridges or mating surfaces. The fan speed was dependent upon the speed of the driving element and the amount of working fluid in the mating grooves and ridges or between the operating surfaces. When the grooves were only partially filled, considerable slip occurred between the two members and the fan speed would be considerably less than the speed of the driving member. If the space between the grooves and ridges were completely filled with fluid, the slip would, below a predetermined speed, such as 2000 rpm, be reduced. When the speed of the driving element rose above a predetermined amount, the viscosity and shear characteristics were such that an increased amount of slippage occurred to prevent substantial increase in fan speed.

The amount of fluid in the shear area was controlled by a thermostatically activated reed valve which opened and closed a pumping hole in the apparatus. At low ambient temperatures, the pumping hole was fully open and the fluid would be pumped into a reservoir at a high rate, thus minimizing the fluid in the shear space. At higher ambient temperatures, the reed valve would close the pumping hole to prevent the fluid from being pumped into the reservoir and the amount of fluid in the shear space would increase, resulting in higher shear forces and reduced slip between the members.

These viscous couplings often require a number of precision machining operations during the manufacture thereof. In addition, relatively expensive shaft seals and bearings are often utilized. The present invention relates to an improved viscous coupling of the general type described for connecting a fan to an automotive vehicle engine.

BRIEF SUMMARY OF THE INVENTION

Briefly, this invention comprises input and output members having a fluid working space therebetween, and means for controlling the amount of fluid in such space.

One of the primary objects of the present invention is to provide a viscous fluid coupling for connecting an automotive engine to a radiator cooling fan, the coupling being responsive to the ambient temperature for varying the couple provided.

Another object of the invention is to provide a viscous fluid coupling of the type described which inhibits excessive fan noise.

A further object of this invention is to provide a viscous fluid coupling such as described in which the temperature range over which the coupling allows the fan speed to go from a minimum to a maximum is extended.

Still another object of this invention is to provide a viscous fluid coupling of the class described which is sensitive to ambient temperatures and compensates for the same.

Another object of this invention is to provide a viscous fluid coupling such as described, the components of which requires a relatively small number of machining operations.

A further object of this invention is to provide a viscous coupling of the class described which is simple and economical in construction and efficient in operation.

Other objects and advantages will be made apparent as the description progresses.

BRIEF DESCRIPTION OF THE DRAWINGS

In the accompanying drawings, in which one of various possible embodiments of this invention is illustrated, FIG. 1 is a vertical section through a viscous coupling constructed in accordance with this invention, the coupling being shown in one mode of operation;

FIG. 2 is a front elevation of the coupling;

FIG. 3 is a section view similar to FIG. 1 showing the coupling in another mode of operation;

FIG. 4 is a rear elevation of the coupling;

FIG. 5 is a view similar to FIG. 4 with the rear cover of the coupling removed;

FIG. 6 is a fragmentary sectional view of FIG. 4, taken above lines 6—6 of FIG. 5; and FIG. 7 is an enlarged fragmentary view of FIG. 5, certain parts being removed for clarity.

Like parts are indicated by corresponding reference characters throughout the several views of the drawings.

DESCRIPTION OF THE PREFERRED EMBODIMENT

Referring now to the drawings, a viscous fluid coupling device of this invention is shown at 1 and includes an input device or impeller 3 and an output or driven member 5. The output member 5 is shown connected to a radiator cooling fan 7, but it will be understood that other driving and driven devices may be drivingly connected by the coupling shown.

The input member 3 is driven by a stub shaft 9 of a hub 11 having a flange 13 thereon. Hub 11 may be connected to a pully (not shown) driven by the engine. Input member 3 is formed as a generally disc-shaped sheet stamping and has a square opening 15 through which a square end 17 of shaft 9 matingly extends. A retaining ring 19 secures the input member 3 and shaft 9 together.

The input member of impeller 3 has two sheet metal stampings 21 and 23 jointed at 24 by a press fit, for example. Impeller 3 has a generally conical-shaped central portion 25 and an annular trough or channel section 27 formed at its periphery by rear portion 25, a ring-shaped outer wall 30 and a radially inwardly extending front wall 22. Spacers 29 are provided for maintaining the proper spacing between the impeller 3 and output member 5. The impeller is preloaded against the spacers by initially deflecting the rear wall 25 forwardly at its central position during assembly. Portion 25 is provided with a plurality of openings 26 (FIG. 5) for allowing fluid to enter the trough as described hereinafter.

Impeller 3 is located within the output or driven member 5, the latter forming a housing and being formed of a back plate or stamping 31 and a front casting 33. Stamping 31 has an inner annular hub 34 secured on the outer race 35 of a bearing 37, the inner race 39 of which is press fitted on shaft 9. A conical section 41 having vents 42 therein is connected to the central portion of stamping 31 and assists in rigidifying the latter. The vents 42 permit air to circulate around bearing 37 for cooling the latter. These vents also allow the ingress and egress of phosphate solution during the corrosion preventing phosphating process of the rear cover.

The outer edge portion of casting 33 is formed as an annular wall 43, the rearward end of which is sealed to the forwardly turned edge portion of stamping 31. The outer edge portion of the casting and stamping form a housing which closely follows the contour of the impeller 3 around which it extends, generally leaving only a slight space which becomes the working area or space of the coupling as pointed out hereinafter. However, a spiral groove 44 is formed in the annular wall 43 and, as will be made apparent, provides a path through which fluid is pumped from the front of the working space to the rear thereof.

The front face 33 is secured by fasteners 45 to a hub plate 47 of fan 7. Casting 33 has a front wall 49 with a plurality of fins 50 extending forwardly at the outer marginal region thereof and a generally annular ledge 51 extending rearwardly from the inside of the front wall into the interior of the housing The ledge 51 supports a generally rearwardly extending L-shaped and annular trough or reservoir 53 having a bottom 55 and an inclined rear wall 57 extending inwardly toward the axis of rotation of the unit and forwardly toward front wall 49.

Wall 49 has two diametrically opposite inclined recesses or distributing channels 59 therein, the inner portions of which are surrounded by inclined generally U-shaped walls 66, the ends of which are integrally formed with the ledge 51. The channels 59 extend outwardly in an inclined direction to the wall 43 and connect with the forward end of the groove 44.

The inner portions of channels 59 are adapted to be substantially covered by the opposite ends of a generally flat reed valve 69 connected by staking, for example, at its center to a rotatable pin 70 mounted in a hub 71 formed in wall 49. The outer end of pin 70 has a slot 72 in which the inner end of a helically wound bimetallic thermostatic member 73 is located. The outer end 75 of the member 73 is hooked onto a post 77 extending forwardly from the wall 49. Variations in the air temperature around thermostatic member 73 will cause the latter to rotate pin 70 and reed valve 69.

The outer end of reed valve 69 has an angled edge portion 79 and is adapted in one position to cover a substantial portion of the U-shaped cavity or pocket formed by walls 55 and 66. Thus, if fluid is located in the reservoir 53 due to centrifigual forces thereon, the discharge area is substantially closed and only a small amount of fluid will escape between the end of the reed 69, reservoir bottom 55 and the walls 66. As the reed 69 moves counter-clockwise, as viewed in FIG. 5, the inclined and angled edge portion 79 will uncover a triangular portion of the angled U-shaped discharge area, the actual uncovered triangular area becoming larger and then generally quadralateral as the reed moves further in the same direction, thereby permitting the rate of discharge of fluid from the reservoir to increase.

Movement of the reed 69 in an opening direction is limited by the bimetal control 73 and movement in a closing direction is limited by the engagement thereof with a stop 83. The rearwardly turned edge portions 79 prevent the outer ends of the reed valve from being hung up or caught on the edges of the channels when moving from an open position to a closed position.

Extending through and outwardly from the bottom 55 of trough 53 is a tubular scoop 85, the inlet opening of which is generally oval and facing opposite the direction of rotation of the impeller 21 so that any fluid in the chamber 27 may be scooped into the tube and forced inwardly through the tube into the trough 53. A deflector 87 extends from the radially inner edge of the wall 57 over the discharge opening of tube 85 to cause fluid to be deflected back into the trough.

Fluid is adapted to be supplied to the reservoir from the working area between the front wall 49 and the impeller 3 by resilient spacer and pumping pads 89 secured to the front wall. Fluid due to centrifugal force moves outwardly toward the annular wall 43 through the spaces between front wall 49 and wall 22. Fluid also flows out channels 59 to the annular wall 43 where all of the fluid, by the frictional drag exerted thereon, and the force of the fluid build-up in channels 59 and between the impeller face 23 and wall 49, moves through the guiding groove 44 to the space between the rear walls 25 and 31. The fluid is then forced inwardly, under the influence of the same forces mentioned above into angled depressions 91 formed in back cover 31. When the level of fluid in the recesses 91 reaches the radially inward level of the outer edges of the openings 26 in impeller wall 25, the fluid is dumped back into the trough 27.

Operation of the coupling is as follows:

During the winter months, when the engine is cold and first started, a supply of silicone fluid, which is placed in the unit during assembly thereof, is located in the lower region of the unit and quickly centrifuges out to a ring of fluid in the chamber 27. The scoop 85 picks up fluid and conveys it to the trough 53. The temperature surrounding thermostatic member 73 is cold and the member causes the outer ends of the reed valve 69 to substantially cover the channels 59 so that the depth of fluid in the trough 53 increases, with a slight amount flowing under the outer end of the reed valve into the space between the impeller 3 and front wall 43. From this space this slight amount of fluid is pumped back into the trough 27 by pads 89 through groove 44, and depressions 91 where it is recirculated through the system. The amount of fluid being circulated is very small, and while it maintains the various parts lubricated, is insufficient to produce any significant driving connection between the impeller 3 and the output member 5. Accordingly, the output member 5 slips a significant amount during such conditions. Inasmuch as the temperature of the air around member 73 is low during initial operation of the engine, very little additional cooling is needed and thus, it is unnecessary to provide any significant drive to the fan.

As the temperature around the thermostatic member increases, due to engine warm-up on both cold and warm days, the reed valve is rotated due to the action of thermostatic member 73 and begins to uncover a portion of the channels 59. As the channels 59 are opened, more fluid flows from trough 53 into the channels and outwardly to the working space between impeller walls and front wall 49, outer wall 43 and the outer portion of wall 31. As the fluid is admitted to the working area the slippage between impeller 23 and output member 5 decreases. The frictional drag exerted on the fluid by impeller 3 pumps the fluid through the groove 44 and depressions 91 to the chamber 27, but the small size of the groove prevents fluid from being pumped from the working space as fast as it flows to the space. This will continue until a point of equilibrium is reached. The construction of the reed valve 69 and channels 59 are such that the temperature range over which a varying amount of fluid is admitted to the working space is relatively small, such as 15° F.–20° F. for example. Thus, the reed valve may open the channels at 150° F. for example, and move to a point at which further opening of the channels does not result in additional fluid flow to the working space at 165° F. for example.

When the working space is filled with fluid to any particular level, determined by the ambient temperature, the input speed to output speed ratio will be approximately 1:1 for a predetermined low input speed, such as occurs in an idle condition. When the input speed exceeds that predetermined level, the output member will begin to slip, due to the fluid characteristics, with the amount of slip determined by the amount of fluid in the working space. When the input speed exceeds a predetermined higher level, the output speed will remain at a relatively constant level as determined by the amount of fluid in the working space. When cooling requirements are at a maximum, the channels 59 are completely uncovered to permit the maximum amount of fluid to flow to the working space, and thereby provide a maximum driving output level.

FIG. 1 shows typical levels $W_1$, $W_2$, and $W_3$ of fluid maintained in the reservoir 53 and chamber 27, and in the working space on cold days when it is unnecessary to have large quantities of air pulled through the radiator. On the other hand, FIG. 2 shows typical levels in the various areas of the coupling when it is very hot and it is necessary to drive the fan at a maximum speed.

It will be seen that the coupling apparatus includes several sheet metal stamped components and a relatively simple die cast front cover, all arranged in a compact and efficient unit.

In view of the foregoing, it will be seen that the several objects and other advantages of this invention are achieved.

Although only one embodiment of the invention has been disclosed and described, it is apparent that other embodiments and modifications of the invention are possible.

We claim:
1. A fluid coupling comprising:
   A. a rotatable input member;
   B. an output member surrounding said input member, defining a working space therebetween, and relatively rotatable with respect to said input member;
   C. fluid means operative to drivingly interconnect said input member and said output member through said working space;
   D. fluid reservoir means connected to said output member;
   E. passage means fluidly interconnecting said reservoir means and said working space;
   F. valve means operatively associated with said passage means and moveable between:
      1. a first, closed position in which flow from said reservoir to said working space is inhibited; and
      2. a second, open position in which flow from said reservoir to said working space is unblocked;
   G. means defining a fluid chamber within said input member;
   H. means for pumping fluid from said working space to said fluid chamber; and
   I. means for delivering fluid from said fluid chamber to said reservoir.

2. A fluid coupling as set forth in claim 1 wherein said input member comprises a sheet metal disc-shaped impeller having rear wall, a ring-shaped generally axially extending outer wall and an inwardly extending forward wall forming said fluid chamber.

3. A fluid coupling as set forth in claim 1 wherein said output member includes a front portion having a rearwardly extending annular ledge thereon, said fluid reservoir means including an annular sheet metal member, generally L-shaped in cross section, having the outer ends of the longer leg of the L-shaped member supported on said ledge, said passage means comprising at least one channel in the rear side of said front portion extending across said ledge, said valve means when in its first position partially blocking said channel and unblocking said channel when in its second position.

4. A fluid coupling as set forth in claim 3 wherein said pump means includes a spiral groove formed in one of said members leading from one side of said coupling to the other thereof to provide a guiding path for fluid flow.

5. A fluid coupling as set forth in claim 1 wherein said valve means comprises a reed valve, a rotatable support mounted on said output member, said reed valve being mounted on said support, and thermostatic means for rotating said support in response to changes in the temperature therearound, said reed valve having an end portion movable across said passage means to open and close the passage means.

6. A fluid coupling as set forth in claim 1 wherein said reservoir means comprises a generally U-shaped trough, the bottom of which includes a generally annular ledge extending rearwardly from said output member, the bottom and other wall of said trough further comprising an annular sheet metal member having a generally L-shape in cross section, said passage being formed by at least one ledge portion extending inwardly from the remainder of said annular ledge, said valve means extending across said ledge portion.

7. A fluid coupling as set forth in claim 6 wherein said pump means includes a spiral groove formed in one of said members leading from one side of said coupling to the other thereof to provide a guiding path for fluid flow.

8. A fluid coupling as set forth in claim 1 wherein said means for delivering fluid from said chamber to said reservoir means comprises a scoop connected to said reservoir means and extending into said chamber to scoop fluid from said chamber to said reservoir means.

9. A fluid coupling as set forth in claim 1 wherein said input member comprises a sheet metal disc-shaped impeller having rear wall, a ring-shaped generally axially extending outer wall and an inwardly extending forward wall forming said fluid chamber, said reservoir means comprising a generally U-shaped trough, the bottom of which includes a generally annular ledge extending rearwardly from said output member, the bottom and other wall of said trough further comprising an annular sheet metal member having a generally L-shape in cross section, said passage being formed by at least one ledge portion extending inwardly from the remainder of said annular ledge, said valve means extending across said ledge portion.

10. A fluid coupling as set forth in claim 9 wherein said pump means includes a spiral groove formed in one of said members leading from one side of said coupling to the other thereof to provide a guiding path for fluid flow.

11. A fluid coupling as set forth in claim 1 wherein said output member includes a front portion having a rearwardly extending annular ledge thereon, said fluid reservoir means including an annular sheet metal member generally L-shaped in cross section, having the outer ends of the longer leg of the L-shaped member supported on said ledge, said passage means comprising at least one channel in the rear side of said front portion extending across said ledge, said valve means when in its first position partially blocking said channel and unblocking said channel when in its second position, wherein said input member comprising a sheet metal disc-shaped impeller having rear wall, a ring-shaped generally axially extending outer wall and an inwardly extending forward wall forming said fluid chamber.

12. A fluid coupling as set forth in claim 1 wherein said pump means includes a spiral groove formed in one of said members leading from one side of said coupling to the other thereof to provide a guiding path for fluid flow.

13. A fluid coupling comprising an input member adapted to be rotatably driven, an output member surrounding and rotatably mounted with respect to said input member, said input and output members forming a working space therebetween for holding viscous fluid operative to permit the transmittal of torque between said input member and said output member, said input member having an annular fluid chamber therein adapted to hold fluid under centrifugal force, said output member having a fluid reservoir means, at least one passage placing said fluid reservoir means in communication with said working space, a thermostatically controlled valve member for controlling the flow of fluid through said passage, means for pumping fluid from said working space to said chamber, and means for scooping fluid from said chamber and delivering the same to said fluid reservoir means, said fluid reservoir means including an annular ledge on said output member, and a retainer pressed on said ledge, said retainer having a generally axially extending bottom and an inwardly extending rear wall.

14. A fluid coupling as set forth in claim 13 wherein said pump means includes a spiral groove formed in one of said members leading from one side of said coupling to the other thereof to provide a guiding path for fluid flow.

15. A fluid coupling as set forth in claim 13 wherein said input member comprises a sheet metal disc-shaped impeller having rear wall, a ring-shaped generally axially extending outer wall and an inwardly extending forward wall forming said fluid chamber.

16. A fluid coupling as set forth in claim 15 including a continuous shoulder extending from said ledge inwardly and across said opening to form a recess, said passage extending from said working space through said recess to said reservoir.

17. A fluid coupling as set forth in claim 16 wherein said valve member extends across said shoulder, said valve member having a rearwardly turned portion along one edge at its outer end.

18. A fluid coupling as set forth in claim 14 wherein said means for scooping fluid from said reservoir comprises a tubular member attached to and opening into said reservoir means, said tubular member extending into said chamber and opening in a direction facing the direction of movement of said impeller to force fluid from said chamber to said reservoir.

19. A fluid coupling as set forth in claim 18 wherein said pump means includes a spiral groove formed in one of said members leading from one side of said coupling to the other thereof to provide a guiding path for fluid flow.

20. A fluid coupling comprising:
A. a rotatable input member;
B. an output member surrounding said input member, defining a working space therebetween, and relatively rotatable with respect to said input member;
C. fluid means operative to drivingly interconnect said input member and said output member through said working space;
D. fluid reservoir means connected to said output member;
E. passage means fluidly interconnecting said reservoir means and said working space;
F. valve means operative to control the flow of fluid through said passage;
G. means defining a fluid chamber within said input member;
H. means for pumping fluid from said working space to said fluid chamber; and
I. means for delivering fluid from said fluid chamber to said reservoir.

* * * * *